H. T. MASON.
PLUG FOR BOILER TUBES OR HOLLOW SHAFTING.
APPLICATION FILED MAR. 16, 1912.
1,068,793.
Patented July 29, 1913.
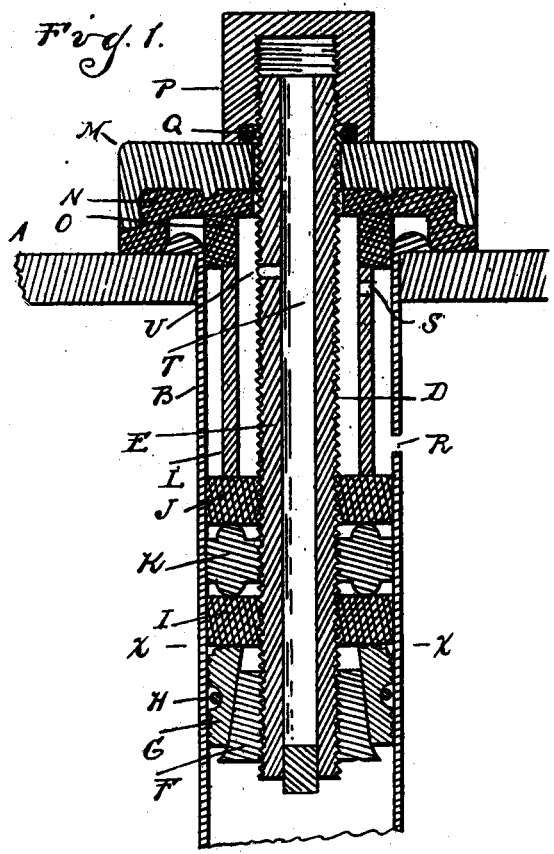
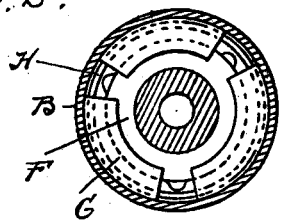
Witnesses
W. K. Frad
James P. Barry
Inventor
Henry T. Mason
By [signature]
Attys

UNITED STATES PATENT OFFICE.

HENRY T. MASON, OF DETROIT, MICHIGAN.

PLUG FOR BOILER-TUBES OR HOLLOW SHAFTING.

1,068,793.  Specification of Letters Patent.  Patented July 29, 1913.

Application filed March 16, 1912. Serial No. 684,164.

*To all whom it may concern:*

Be it known that I, HENRY T. MASON, a citizen of the United States of America, residing at Detroit, in the county of Wayne and State of Michigan, have invented certain new and useful Improvements in Plugs for Boiler-Tubes or Hollow Shafting, of which the following is a specification, reference being had therein to the accompanying drawings.

My invention relates to improvements in stoppers for boiler tubes or hollow shafting, and resides in the peculiar construction, arrangement and combination of parts, as more fully hereinafter described and particularly pointed out in the claims.

In the drawings,—Figure 1 is a sectional view through a boiler tube showing my improved device applied thereto; and Fig. 2 is a section on the line *x—x* of Fig. 1.

While my improved stopper is adapted for various uses, it is particularly designed to be employed for repairing tubes for boilers of the type in which the water or steam circulates around the tubes, the latter serving as flues for the heated gases. I will therefore describe my invention in connection with this type of boiler.

A represents one of the tube sheets of the boiler, B a tube, and D my improved stopper. The expansible bolt for the stopper comprises a shaft or rod E, a wedge F having a screw-threaded engagement with the inner end of the shaft, and an expansible head G formed of a plurality of radial sections arranged about the wedge and yieldably held together by a split resilient spring H.

I J are complementary packing rings, between which is arranged an expanding ring K. Upon the shaft E beyond the packing J is a tubular sleeve L of a greater size than the shaft, forming a space therebetween, the purpose of which will hereinafter appear.

M is the packing cap, N O packings positioned intermediate the cap and the end of the sleeve L, and P the clamping nut, the latter being preferably provided with a packing ring Q.

In use, assuming that the tube is broken at R, the parts are arranged within the tube so that the expansible packing is below the rupture R, as shown in Fig. 1. The clamping nut is then tightened, which causes the head to expand, the wedge F firmly clamping the latter to the wall of the tube. In order to insure the desired frictional engagement between the tube wall and the head sections, the outer faces of the sections are preferably narrowed or roughened. After the head G is clamped to the tube wall, a further adjustment of the nut causes the expansion of the packing rings I J, this being effected through the medium of the sleeve L and the packing cap M.

As the stopper is subjected to a very high degree of heat, considerable difficulty has been experienced in providing a stopper that will stand up for the desired length of time under the intense heat it is subjected to. Especially is this true if it is necessary to repair the tube at a point adjacent the fire pot. To overcome this objection I have provided means for water-cooling the parts. Thus, the sleeve is provided with one or more openings or apertures S, and the outer end of the shaft is provided with a bore T which communicates with the space between the shaft and the sleeve by means of one or more openings U, while the nut P is formed hollow. When the stopper is in place, steam or water is of course free to enter the tube through an opening R, but the expansible packing will prevent the steam from passing below the same. The steam will therefore pass through apertures S and U to the bore T, and from the latter to the hollow cap. By this arrangement, the various parts of the stopper are effectively water-cooled.

Another very desirable feature of my improved structure is that it permits the expansible packing to be readily adjusted in relation to the shaft, so that the packing may occupy the proper position in relation to the rupture in the tube. Thus, if the tube is ruptured at a point considerably below the one shown in the drawing, the wedge can be adjusted longitudinally of the shaft and a longer sleeve employed; also, if the rupture is adjacent the tube sheet, it is merely necessary to adjust the nut longitudinally of the rod and substitute a sleeve of proper length.

While I have shown and described the preferred construction of my improved stopper, I do not desire to limit myself to the specific structure illustrated.

What I claim as my invention is,—

1. The combination of an operating rod, an adjustable wedge thereon, an expansible head surrounding the wedge, an expansible packing, a packing cap, an adjusting nut, and means intermediate the cap and packing for expanding the latter upon the adjustment of said nut.

2. In a stopper for boiler tubes the combination of an expanding bolt including an operating rod provided with a bore, an expansible packing on the latter, and means coöperating with said bolt for expanding the packing, said bore being adapted to communicate with the interior of the tube.

3. In a stopper for boiler tubes, the combination of an expanding bolt including an operating rod provided with a bore, an expansible packing on the latter, a hollow nut adjustably engaging said rod and having the hollow chamber thereof in communication with said bore, and means coöperating with the nut and expanding bolt for expanding said packing, said bore being adapted to communicate with the interior of the tube.

4. In a stopper for boiler tubes, the combination with an operating rod provided with a bore, a wedge thereon, an expansible head surrounding the wedge, a sleeve loosely surrounding said rod, an expansible packing between said head and the sleeve, a cap nut beyond the sleeve, and an adjusting nut for clamping said parts, said sleeve and bolt having transverse openings therethrough, for the purpose described.

5. In a stopper for boiler tubes, the combination with an operating rod provided with a bore, a wedge thereon, an expansible head surrounding the wedge, a sleeve loosely surrounding said rod, an expansible packing between said head and the sleeve, a cap nut beyond the sleeve, and a hollow adjusting nut for clamping said parts, the hollow chamber of said nut being in communication with said bore.

6. In a stopper for boiler tubes, the combination of a rod, a wedge thereon, an expansible head surrounding said wedge, a sleeve upon the rod, expansible packing between the head and sleeve, a cap packing intermediate the cap and the sleeve, and a nut for clamping the parts.

7. In a stopper for boiler tubes, the combination of a rod, a wedge longitudinally adjustably engaging the rod, an expansible head surrounding said wedge, a sleeve upon the rod, expansible packing between the head and sleeve, a cap packing intermediate the cap and the sleeve, and a nut for clamping the parts.

In testimony whereof I affix my signature in presence of two witnesses.

HENRY T. MASON.

Witnesses:
W. J. BELKNAP,
JAMES P. BARRY.